(12) United States Patent  (10) Patent No.: US 7,784,763 B2
Bunker  (45) Date of Patent: Aug. 31, 2010

(54) TRANSMISSION MOUNT

(76) Inventor: Donald D. Bunker, 32281 Peppertree Bend, San Juan Capistrano, CA (US) 92675

( * ) Notice: Subject to any disclaimer, the term of this patent is extended or adjusted under 35 U.S.C. 154(b) by 0 days.

(21) Appl. No.: 12/722,392

(22) Filed: Mar. 11, 2010

(65) Prior Publication Data

US 2010/0163704 A1 Jul. 1, 2010

Related U.S. Application Data

(63) Continuation of application No. 11/657,246, filed on Jan. 24, 2007.

(51) Int. Cl.
F16M 13/00 (2006.01)
(52) U.S. Cl. .................................... 248/637
(58) Field of Classification Search ................. 248/637
See application file for complete search history.

(56) References Cited

U.S. PATENT DOCUMENTS 2,906,572 A * 9/1959 Wroby ....................... 384/536
D395,892 S * 7/1998 Solomon ................... D14/224
6,250,413 B1 * 6/2001 Horton ....................... 180/291

* cited by examiner

Primary Examiner—J. Allen Shriver, II
Assistant Examiner—Erin Smith
(74) Attorney, Agent, or Firm—Stetina Brunda Garred & Brucker

(57) ABSTRACT

An automotive transmission mount comprises a top bracket, a bottom bracket and a polyurethane material overmolding to top and bottom brackets. The top bracket is attachable to a tail shaft of a transmission housing. The bottom bracket is attachable to a cross member of a vehicle frame. The polyurethane material includes a lateral relief hole extending therethrough and being oriented parallel to the top bracket. The lateral relief hole is adapted to deform during compression of the resilient material as a result of relative movement of the top bracket toward the bottom bracket to prevent shearing of the polyurethane. The top bracket and bottom brackets are also interlocked to one another to prevent their separation.

20 Claims, 3 Drawing Sheets

TRANSMISSION MOUNT

CROSS-REFERENCE TO RELATED APPLICATIONS

The present application is a continuation patent application of U.S. patent application Ser. No. 11/657,246, filed on Jan. 24, 2007, entitled Transmission Mount, the entire contents of which are incorporated herein by reference.

STATEMENT RE: FEDERALLY SPONSORED RESEARCH/DEVELOPMENT (Not Applicable)

BACKGROUND

The present invention relates generally to mounting devices and, more particularly, to an interlocking automotive transmission mount that is specifically adapted to allow downward movement of the transmission relative to a vehicle frame to which the transmission is secured without torque-induced breakage of the resilient material overmolding the transmission mount.

In automotive applications, transmissions are typically installed in motor vehicles such as automobiles by mounting on a cross member which, in turn, is attached to the frame of the vehicle. The cross member is typically oriented laterally with respect to the vehicle frame. The transmission is typically disposed above the cross member and is secured thereto by a transmission mount.

Factory-installed transmission mounts generally comprise a vertically-spaced pair of horizontal metal plates which are interconnected by a rubber core. The transmission mount is inserted between the bottom of the transmission housing and the top of the cross member to provide support and shock absorption for the transmission. In many vehicles, the top plate of the transmission mount is secured to the bottom of the transmission housing by means of a spaced pair of holes or perforations which are sized to receive corresponding studs or bolts which protrude downwardly from the transmission housing. In a similar manner, the bottom plate of convention transmission mount features one, two or three studs or threaded holes which engage with corresponding apertures or bolts formed in the cross member.

The transmission mount is fastened to the cross member by securing the bottom plate of the transmission thereto. The transmission is then installed on top of the transmission mount and is secured to the top plate and is connected to other parts of the vehicle as well as to the drivetrain. Once installed, the transmission is braced and supported by the cross member via the transmission mount. Transmission mounts also maintain proper angular orientation of the drive shaft exiting the transmission in order to prevent premature wear and damage to drivetrain components.

In addition to maintaining proper orientation of the transmission housing, the rubber core of the transmission mount is specifically adapted to control torque produced by the transmission as may occur during rapid acceleration of the vehicle. In addition, the rubber core of the transmission mount absorbs vibration that would otherwise be transmitted to the remainder of the motor vehicle resulting in a loss of comfort to driver and passengers.

One example of a contemporary automotive transmission mount is disclosed in U.S. Pat. No. 5,251,865, issued to Kelly. The Kelly patent discloses a transmission mount having a rubber core disposed intermediate a top plate configured for attachment to the transmission housing. The Kelly patent also discloses a bottom plate configure for attachment to a cross member of the vehicle frame. The transmission mount of the Kelly patent includes a rubber core to provide some degree of shock isolation and vibration dampening.

Although such contemporary automotive transmission mounts have proven generally suitable for their intended purposes, they possess certain deficiencies which detract from their overall utility. For example, the transmission mount disclosed in the Kelly reference includes an inherent deficiency wherein the upper and lower plates are not interlocked. As a result, deterioration and/or debonding of the rubber interconnecting the top and bottom plates can, over time, result in complete detachment of the upper plate from the lower plate and thereby rendering the Kelly automotive transmission mount ineffective.

In addition, as is typical of prior art automotive transmission mounts, the rubber used in the Kelly reference is susceptible to degradation over time due to various environmental factors. For example, it is well known in the art that rubber deteriorates due to exposure to certain materials such as oils, road salt, chemicals and other corrosives. In addition, rubber is known to deteriorate as a result of extended exposure to atmospheric contaminants such as ozone and smog which can attack and degrade the rubber over time. In addition, rubber is known to shrink and harden over time due to a loss of polymers from the rubber. The deleterious effects on vehicle performance as a result of worn, damaged or hardened transmission mounts is even more pronounced when motor vehicles are operated in extreme conditions such as in off-road driving and during competition such as in automobile racing.

In certain early-model motor vehicles designed and manufactured in the United States, the spacing between the top and bottom plates of the transmission mount is greater than that of contemporary automotive transmission mounts. For example, transmission mounts as used in many 1960's and 1970's automobiles manufactured by the Chrysler Corporation are provided in a "tall" style with a relatively large spacing between the top and bottom plates. As was earlier mentioned, the rubber core filling the space between the top and bottom plates in these "tall" transmission mounts must be capable of transferring torque forces and vibration from the transmission to the cross member without over-stressing the rubber core. As may be appreciated, over-stressing the rubber core may result in shearing of the rubber which can result in complete detachment of the upper plate from the lower plate.

As such, there exists a need in the art for a automotive transmission mount that is capable of absorbing torque and vibrational forces imposed thereon by the transmission. Furthermore, there exists a need in the art for a transmission mount that is capable of deforming or compressing as a result of such high torque forces without shearing of the resilient core material bonding the upper and lower plates. Finally, there exists a need in the art for a transmission mount that exhibits the above-mentioned characteristics and which is further capable of preventing complete detachment of the top plate from the bottom plate in the event of a failure of the core material connecting the top and bottom plates together.

BRIEF SUMMARY

The above-described deficiencies and drawbacks associated with transmission mounts of the prior art are specifically addressed and alleviated by the present invention which provides a transmission mount for a motor vehicle that is capable of increased deformation of the resilient material without shearing. In its broadest sense, the transmission mount comprises a top bracket, a bottom bracket interlocked to the top bracket, a resilient material such as polyurethane overmolding the top and bottom brackets, and a lateral relief hole extending through the polyurethane. Advantageously, the lateral relief hole is adapted to deform during compression of the polyurethane as a result of movement of the top bracket relative to the bottom bracket such that shearing or tearing of the polyurethane under load is prevented.

The top bracket is configured to be detachable to a transmission housing such as a tail shaft thereof. The top bracket may be generally T-shaped and may comprise a top plate portion and a vertical plate portion extending laterally downwardly from the top plate portion. The vertical plate portion may include an opening such as a circular opening therewithin.

The bottom bracket is configured to be attachable to a vehicle frame such as a cross member of the vehicle. The bottom bracket may be generally U-shaped and may comprise a horizontal web and a pair of spaced vertical webs extending laterally outwardly or upwardly from the horizontal web toward the top plate portion. The vertical plate portion is preferably oriented in generally equidistantly spaced relation to the vertical web of the bottom bracket.

The bottom bracket further includes a locking pin which may be generally cylindrically shaped and which may extend between the pair of vertical webs. The locking pin is disposed in spaced parallel relation to the horizontal web of the bottom bracket. The locking pin is extensible or passes through the opening such as through a center thereof. In this regard, the locking pin serves to interlock the top bracket to the bottom bracket in order to prevent separation of the top and bottom brackets in the event of a failure of the resilient (e.g., polyurethane) material.

The lateral relief hole extends through the polyurethane material and is preferably oriented parallel to the top plate portion and is generally centered relative to the vertical plate portion. The lateral relief hole is also preferably equidistantly spaced between a plate edge of the vertical plate portion and an inner surface of the horizontal web. The lateral relief hole is specifically adapted to deform during compression of the resilient material as a result of movement of the top bracket toward the bottom bracket such that shearing of the resilient material is prevented.

BRIEF DESCRIPTION OF THE DRAWINGS

These as well as other features of the present invention will become more apparent upon reference to the drawings wherein.

DETAILED DESCRIPTION

Figure 1:
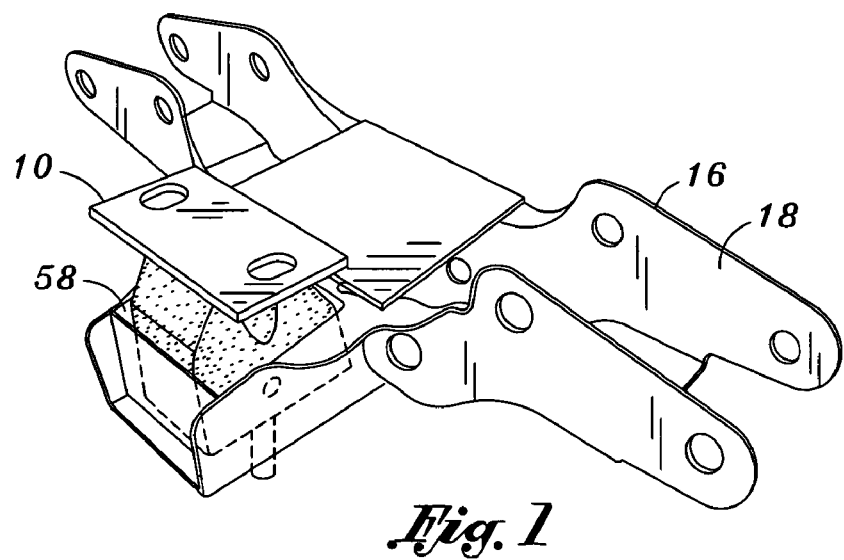
FIG. 1 is a perspective view of an automotive transmission mount installed in a cross member of a motor vehicle.
Figure 2:
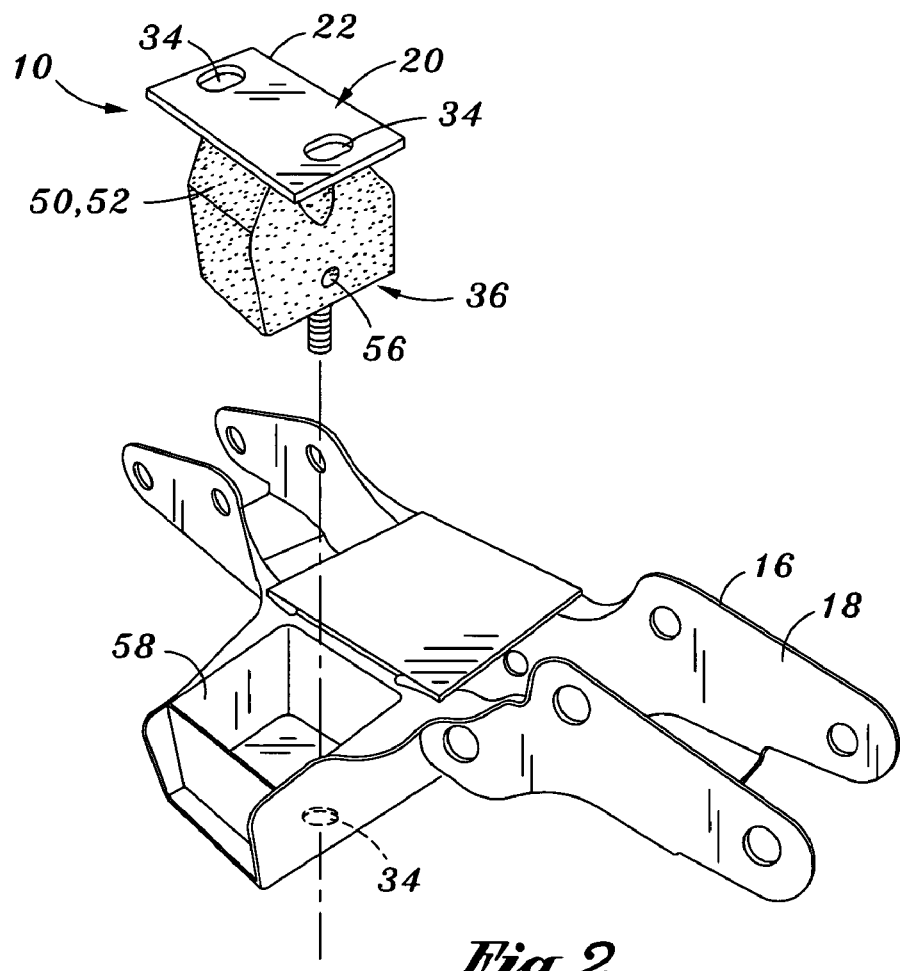
FIG. 2 is an exploded perspective view illustrating the interconnectivity of the transmission mount with the cross member in an exemplary embodiment.

Referring now to the drawings wherein the showings are for purposes of illustrating preferred embodiments of the present invention only and not for purposes of limiting the same, shown in FIGS. 1 and 2 is a transmission mount 10 in an exemplary configuration as installed in a cross member 18 of a motor vehicle. The cross member 18 as typically known in the art is extended laterally on an underside of the motor vehicle and is secured to structural members of the vehicle frame 16. The cross member 18 may be secured to the vehicle frame 16 by means of a plurality of mounting holes as can be seen in FIGS. 1 and 2.

Optionally, the cross member 18 may include a cup 58 having an aperture 34 disposed in a bottom portion of the cup 58 for securing the transmission mount 10 to the cross member 18. However, it should be noted that the cross member 18 may be provided in a variety of alternative configurations other than that which is shown in FIGS. 1 and 2. Additionally, the attachment of the transmission mount 10 to the cross member 18 may be by alternative structural means other than the cup 58 illustrated in FIGS. 1 and 2.

Figure 5:
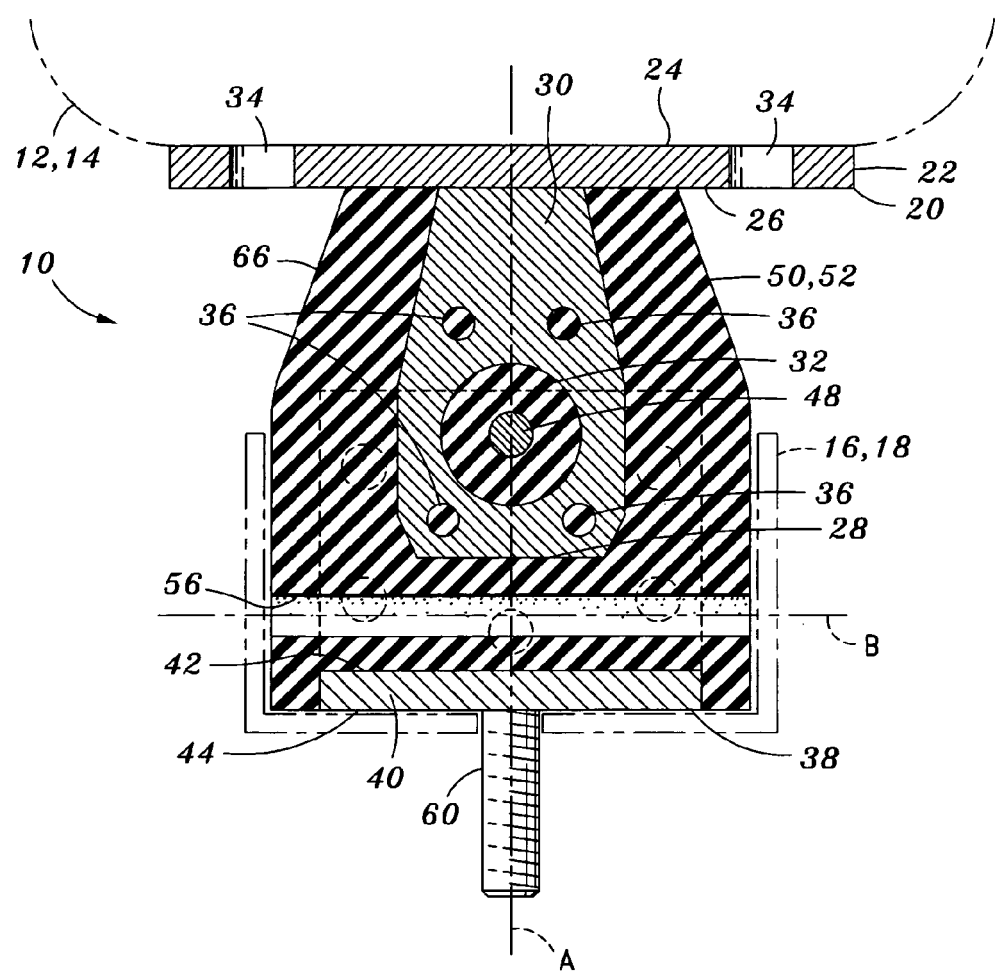
FIG. 5 is a cross-sectional view of the transmission mount taken along a plane oriented parallel the vertical plate portion.

Referring briefly to FIG. 5, the transmission mount 10 comprises a top bracket 20 and a bottom bracket 38 with a resilient member 50 overmolding the top and bottom brackets 20, 38. The resilient member 50 is formed out of a resilient material and provides a load path by which vibrational forces are minimized and torque from the transmission is transmitted to the vehicle frame 16 via the cross member 18. In this regard, the resilient material 50 disposed between the top and bottom brackets 20, 38 is preferably formulated of a compound that provides the desired mechanical properties such as resistance to compression and tension loads as well as sufficient tear strength as well as the appropriate flexural properties which are generally a function of the hardness of the material. As will be described in greater detail below, an ideal compound for formulating the resilient material 50 is a polyurethane 52 compound due to its relatively high load-bearing capability as compared to conventional elastomers such as rubber as used in prior art transmission mounts 10.

In addition, rubber tends to loose its elasticity and hardness over time which can results in cracking under elevated forces. However, polyurethane 52 exhibits relatively high impact resistance and toughness due to its high tensile strength and high module of elasticity. Advantageously, as mentioned above, the polyurethane 52 compound as used in the transmission mount 10 of the present invention is also capable of absorbing vibrations emanating from the transmission. By absorbing vibration, the transmission mount enhances the comfort level for rider and passengers while still controlling torque from the transmission and while maintaining proper drive shaft angle. In addition, polyurethane 52 is known to exhibit high resistance to degradation as a result of oxygen and ozone exposure in addition to its relatively high resistance to corrosive chemicals such as oil and grease commonly used in motor vehicles.

Figure 3:
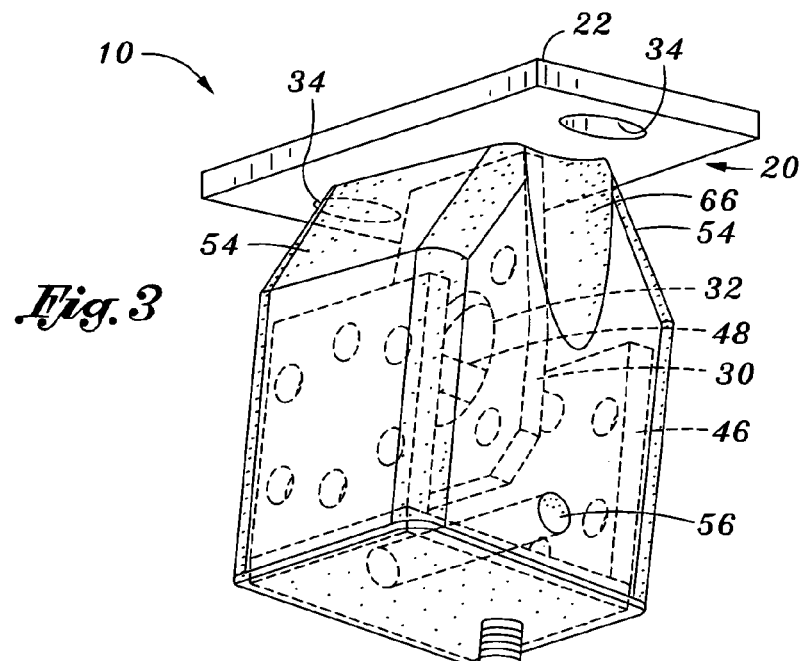
FIG. 3 is a perspective view of the transmission mount illustrating a top bracket interlocked to a bottom bracket and being overmolded with resilient material such that the resilient material is disposed between the top and bottom brackets.
Figure 4:
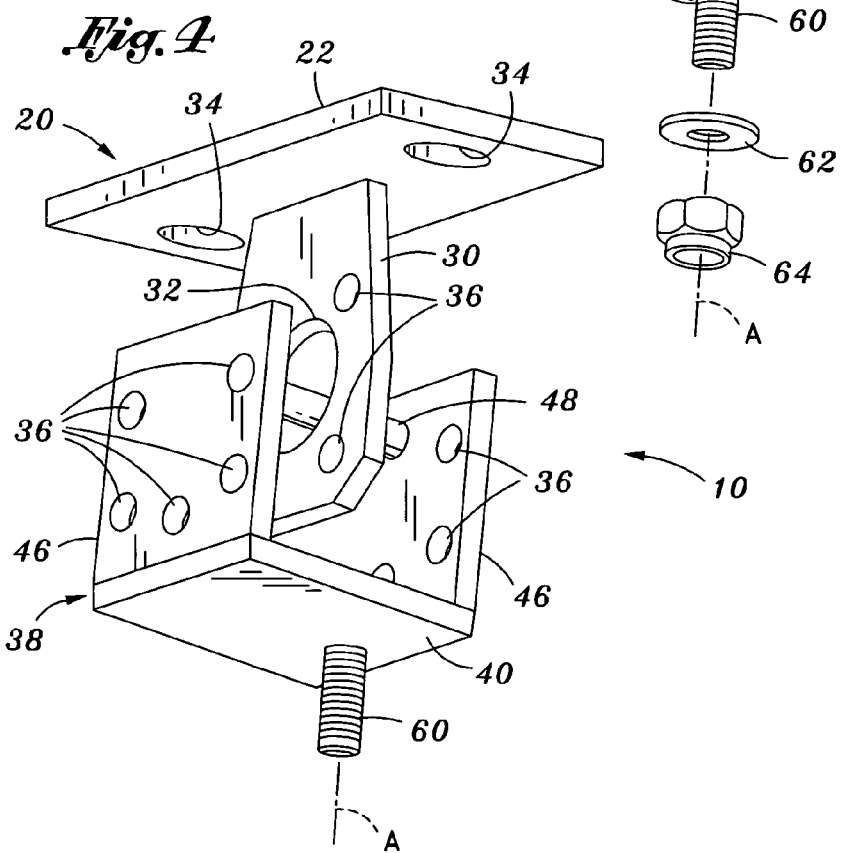
FIG. 4 is a perspective view of the transmission mount omitting the resilient material in order to illustrate the interlocking of a vertical plate portion of the top bracket to a locking pin of the bottom bracket.

Referring still to FIG. 5, the transmission mount 10 is shown installed between the cross member 18 and a tail shaft 14 of the transmission housing 12. Attachment of the top bracket 20 to the transmission housing 12 is provided by means of a top plate portion 22 to which a vertical plate portion 30 extends laterally downwardly therefrom as shown in FIGS. 3 and 4. The top plate portion 22 has top and bottom surfaces 24, 26 and comprises a pair of apertures 34 which are preferably slotted to facilitate mounting of the top plate to the transmission housing 12.

Attachment of the bottom bracket 38 to the vehicle frame 16 is facilitated by means of a horizontal web 40 having at least one threaded stud 60 or pin extending downwardly therefrom and which is designed to engage a corresponding aperture 34 formed in the vehicle frame 16 such as in the cup 58 of the cross member 18 shown in FIGS. 2 and 5. Although a single threaded stud 60 is shown extending from the horizontal web 40 of the bottom bracket 38, any number may be provided. Likewise, although a pair of apertures 34 are illustrated as being formed in the top plate portion 22 of the top bracket 20, any number of apertures 34 may be provided and preferably in a quantity equal to the number of mating fasteners extending from the transmission housing 12.

As shown in FIGS. 3-5, the top bracket 20 is generally T-shape and is comprised of the top plate portion 22 and a vertical plate portion 30 extending laterally outwardly or downwardly from the top plate portion 22. The vertical plate portion 30 includes an opening 32 formed therewithin for interlocking the top bracket 20 to the bottom bracket 38 in a manner to be described below. The bottom bracket 38 is generally U-shaped as best seen in FIG. 4 and comprises the horizontal web 40 and a pair of spaced vertical webs 46 extending laterally outwardly or upwardly from the horizontal web 40. The bottom bracket 38 further includes a locking pin 48 extending between the pair of vertical webs 46 and being disposed in spaced relation to the horizontal web 40 and oriented parallel thereto. The locking pin 48 is illustrated as a cylindrical elongate member passing through the opening 32 in order to interlock the top bracket 20 to the bottom bracket 38 to prevent separation therefrom upon failure of the resilient material 50.

Importantly, the transmission mount 10 of the present invention includes a lateral relief hole 56 extending through the resilient material 50 as shown in FIGS. 3 and 5. The lateral relief hole 56 is specifically adapted to deform during compression of the resilient material 50. More specifically, the lateral relief hole 56 formed in the resilient material 50 is specifically sized and oriented in order to accommodate compression of the resilient material 50 during relative movement of the top bracket 20 downwardly toward the bottom bracket 38 as may occur during imposition of high torque loads such as may occur during rapid acceleration of the motor vehicle. Advantageously, the inclusion of the lateral relief hole 56 in the specific location of the resilient material 50 allows the resilient material 50 to deform without tearing, splitting or shearing of the resilient material 50 which would otherwise reduce or eliminate the vibration absorption and load carrying capability of the transmission mount.

Referring briefly to FIG. 5, the vertical plate portion 30 of the top bracket 20 can be seen as having a plate edge 28 which is disposed in spaced relation to the horizontal web 40 of the bottom bracket 38. The horizontal web 40 likewise includes an inner surface 42 formed opposite the plate edge 28. The lateral relief hole 56 is preferably disposed between and is preferably located generally equidistantly from the plate edge 28 and the inner surface 42. The vertical centering of the lateral relief hole 56 relative to the plate edge 28 and the inner surface 42 of the horizontal web 40 optimizes the deformability of the resilient material 50 but without shearing of the resilient material 50 which may otherwise occur if the lateral relief hole 56 were omitted.

As shown in FIG. 3, the lateral relief hole 56 may be generally aligned with the plate edge 28. In this regard, the lateral relief hole 56 is generally centered relative to a central plane of the vertical plate portion 30. Although illustrated in a cylindrical configuration, alternative shapes and sizes of the lateral relief hole 56 may be provided. For example, the lateral relief hole 56 may be provided in an oval, square, rectangular, triangular or any other suitable polygonal or non-polygonal cross sectional shape. In addition, the lateral relief hole may extend only partially through the resilient material or may be comprised of spaced voids formed in the resilient material 50.

Furthermore, it is contemplated that any number of lateral relief holes 56 may be formed through the resilient material 50 other than the single lateral relief hole 56 shown. For example, a pair of spaced lateral relief holes 56 may be equidistantly disposed on opposing sides of the vertical plate portion 30 and may be vertically positioned in non-centered relation to the plate edge 28 and the inner surface 42 of the horizontal web 40. Regarding the positioning of the threaded stud 60 extending downwardly from the horizontal web 40 of the bottom bracket 38, the stud axis A of the stud 60 is preferably disposed in intersecting relationship with a relief hole axis B defined by the lateral relief hole 56. As can be seen in FIG. 5, the stud axis A is preferably centered along a width of the lateral relief hole 56 axis although the stud 60 may be disposed in offset relationship to the relief hole axis B, in particular, and in offset relationship to the horizontal web 40, in general.

Referring to FIGS. 4 and 5, the locking pin 48 which extends between the pair of vertical webs 46 of the bottom bracket 38 is shown as being generally centered within the opening 32 formed in the vertical plate portion 30 of the top bracket 20. In this manner, the top and bottom brackets 20, 38 are interlocked with one another in order to prevent separation of the bottom bracket 38 from the top bracket 20. Centering the locking pin 48 within the opening 32 provides movement of the top bracket 20 relative to the bottom bracket 38 in all directions and in equal proportion.

Although the opening 32 is shown as being a circular opening 32, the opening 32 may be provided in any shape or size. However, the relative sizing between the locking pin 48 and the opening 32 is such that the top bracket 20 may move in generally unrestricted amounts relative to the bottom bracket 38 subject to the mechanical load-carrying capability of the resilient material 50 bonding the top bracket 20 to the bottom bracket 38. For example, for a circular opening 32 and a cylindrical locking pin 48, the diameter of the opening 32 may be sized to be approximately three times the diameter of the locking pin 48 to allow unrestricted movement of the pin relative to the opening 32. However, it should also be noted that the locking pin 48 may be located in a non-centered or off-axis orientation relative to the opening 32 as may be desirable if the forces passing through the transmission mount 10 are oriented in a single predominant direction.

The transmission mount 10 may further comprise a plurality of bonding holes 36 or openings that are formed through the vertical plate portion 30 as well as through each one of the vertical webs 46. Such bonding holes 36 may be drilled, machined, stamped or formed in any suitable manner in the vertical plate portion 30 and vertical webs 46 and are preferably oriented parallel to the axis of the locking pin 48 as best seen in FIG. 4. The bonding holes 36 are provided to facilitate interconnection of the resilient material 50 to the top and bottom brackets 20, 38 wherein the bonding holes 36 are filled with the resilient material 50 during the overmolding process. More specifically, the resilient material 50 extends through the bonding holes 36 on both sides of the member.

In this manner, the bonding holes 36 provide increased resistance to shearing forces occurring between the resilient material 50 and the top and bottom brackets 20, 38 under normal usage of the transmission mount 10. Such shearing forces may develop under tensile and compressive loads acting to respectively pull apart and push together the top and bottom brackets 20, 38. Overmolding of the resilient material 50 on the top and bottom brackets 20, 38 is best illustrated in FIGS. 3 and 5. As shown, the resilient material 50 has a generally constant cross section in the area of the bottom bracket 38 as shown in FIG. 5. However, the resilient material 50 tapers inwardly toward a reduced cross sectional area along a direction from the bottom bracket 38 toward the top plate portion 22 of the top bracket 20.

As best seen in FIG. 3, the taper portion 54 preferably formed in the resilient material 50 is disposed on all four sides of the transmission mount 10 but is most pronounced along a direction that is perpendicular to the plane defined by the vertical plate portion 30 of the top bracket 20. The taper that is shown in FIG. 5 is largely a result of a pair of scallops 66 formed on opposing sides of the transmission mount 10. Such scallops 66 are provided as clearances for the installation of fasteners extending through the apertures 34. More specifically, the scallops 66 provide clearance for nuts 64 that may be threadably secured to the fasteners to attach the top plate portion 22 to the transmission housing 12. Mechanical fastening of the top bracket 20 to the transmission housing 12 may be by means of a combination of washers 62 and nuts 64 which are securable to the threaded studs from the transmission housing in a manner similar to that which is shown in FIG. 3.

Referring briefly to FIG. 5, it can be seen that the resilient material 50 (i.e., polyurethane 52) laterally overlaps the opposing sides of the bottom bracket 38 such that the entirety thereof is essentially completely enveloped by and contained within the resilient material 50. However, an outer surface 44 of the horizontal web 40 of the bottom bracket 38 is preferably devoid of resilient material 50 such that the mounting of the bottom bracket 38 to the cross member 18 is essentially a metal-to-metal contact. The top and bottom brackets 20, 38 are preferably of metallic construction such as steel having a zinc plating in order to provide enhanced corrosion resistance. However, any other suitable material with any suitable coating may be utilized for fabricating the top and bottom brackets 20, 38.

As shown in FIGS. 3 and 4, the top plate portion 22 may optionally be disposed in angled orientation relative to a plane defined by the horizontal web 40 of the bottom bracket 38. This arrangement between the top and bottom brackets 20, 38 is vehicle-specific. For example, the angles arrangement of the top and bottom brackets as shown in the figures is suitable for use in early-model (e.g., 1965-1975) automobiles manufactured by the Chrysler Corporation. However, it will be recognized that the top and bottom brackets 20, 38 may be provided in any angular orientation relative to one another in order to properly mate with the transmission housing 12 and cross member 18 of a variety of different vehicles.

The transmission mount 10 as configured in accordance with the present invention is preferably fabricated by initially locating the top and bottom brackets 20, 38 into a suitable mold following interlocking thereof. As was earlier mentioned, the extension of the locking pin 48 through the opening 32 provides the interlock feature which prevents separation of the top bracket 20 from the bottom bracket 38 in the event of a failure of the resilient material 50 (e.g., polyurethane 52). Following proper positioning of the top and bottom brackets 20, 38 in the mold, resilient material 50 is injected into the mold and subsequently cooled in order to bond the top bracket 20 to the bottom bracket 38.

As was earlier mentioned, the resilient material 50 is preferably a polymeric material and, even more preferably, is a polyurethane 52 compound having a desired hardness in order to provide improved performance relative to conventional transmission mounts 10 typically formed of a softer rubber compound. Although polyurethanes 52 are available in a wide variety of hardness levels, the polyurethane 52 that is utilized in the present invention preferably has an elevated durometer (i.e., hardness) rating as compared to the hardness rating of most rubbers. Due to this increased hardness level as well as improved resistance to dry heat, oxygen, ozone attack, and resistance to oil, grease and chemicals, the polyurethane 52 also provides enhanced durability to environmental attack as compared to transmission mounts 10 fabricated with rubber.

Additional modifications and improvements of the present invention may also be apparent to those skilled in the art. For example, various configurations of the top plate portion 22 and bottom bracket 38 are contemplated. Furthermore, the bonding holes 36 disposed within the top and bottom brackets 20, 38 may be provided in a variety of sizes, shapes and orientations and in varying patterns in order to enhance the interconnectivity of the top bracket 20 to the bottom bracket 38. Furthermore, the top and bottom brackets 20, 38 may be configured for adaptability with transmissions and vehicle frames 16 of different makes and models of motor vehicles. As such, the particular combination of parts described and illustrated herein is intended to represent only certain embodiments of the present invention and is not intended to serve as limitations of alternative devices within the spirit and scope of the invention.

What is claimed is:

1. An automotive transmission mount, comprising:
    a top bracket configured to be attachable to a transmission housing;
    a bottom bracket configured to be attachable to a vehicle frame and being interlocked with the top bracket to prevent separation of the bottom bracket from the top bracket, the bottom bracket being pivotable and translatable relative to the top bracket;
    a resilient member disposed between the top bracket and the bottom bracket; and
    a lateral relief hole extending through the resilient member and being oriented parallel to the top bracket, the lateral relief hole being adapted to deform during compression of the resilient member as a result of relative movement of the top bracket toward the bottom bracket such that shearing of the resilient member is prevented.

2. The transmission mount of claim 1 wherein:
    the top bracket is T-shaped and is comprised of a top plate portion and a vertical plate portion extending laterally outwardly from the top plate portion, the vertical plate portion includes an opening formed therewithin;
    the bottom bracket being U-shaped and comprising a horizontal web and a pair of spaced vertical webs extending laterally outwardly from the horizontal web;
    a locking pin extending between the pair of vertical webs and being disposed in spaced relation to the horizontal web;
    the locking pin passing through the opening to interlock the top bracket to the bottom bracket.

3. The transmission mount of claim 2 wherein:
    the vertical plate portion has a plate edge disposed in spaced relation to the horizontal web;
    the horizontal web having an inner surface;
    the lateral relief hole being disposed between the plate end and the inner surface.

4. The transmission mount of claim 3 wherein the lateral relief hole is aligned with the plate edge.

5. The transmission mount of claim 1 wherein the resilient member has a reduced cross sectional area along a direction from the bottom bracket toward the top bracket.

6. The transmission mount of claim 2 wherein the locking pin is generally centered within the opening to allow equidistant translation of the top bracket relative to the bottom bracket along a direction parallel to a plane defined by the opening.

7. The transmission mount of claim 6 wherein the opening is circular and the locking pin is cylindrical, the diameter of the opening being approximately three times the diameter of the locking pin to allow movement of the pin relative to the opening.

8. The transmission mount of claim 2 wherein the horizontal web includes a stud extending outwardly therefrom for securing the bottom bracket to the vehicle frame.

9. The transmission mount of claim 8 wherein:
the stud defines a stud axis
the lateral relief hole defines a relief hole axis;
the stud axis being disposed in intersecting relationship with the relief hole axis.

10. The transmission mount of claim 2 wherein the top plate includes a pair of slotted apertures for securing the top bracket to the transmission housing.

11. The transmission mount of claim 2 further comprising:
a plurality of bonding holes extending through the vertical plate portion and through each one of the vertical webs;
the bonding holes being filled with the resilient member for resistance to shearing forces occurring between the resilient member and the top and bottom bracket.

12. The bushing of claim 1 wherein the resilient member is a polymeric material.

13. The bushing of claim 12 wherein the polymeric material is a polyurethane compound.

14. An automotive transmission mount, comprising:
a top bracket configured to be attachable to a tail shaft of a transmission housing, the top bracket being T-shaped and comprising a top plate portion and a vertical plate portion extending laterally outwardly from the top plate portion, the vertical plate portion includes a circular opening formed therewithin;
a bottom bracket configured to be attachable to a cross member of a vehicle frame, the bottom bracket being U-shaped and comprising a horizontal web and a pair of spaced vertical webs extending laterally outwardly from the horizontal web and having a cylindrical locking pin extending between the pair of vertical webs, the locking pin being disposed in spaced parallel relation to the horizontal web and passing through a center of the opening to interlock the top bracket to the bottom bracket, the bottom bracket being pivotable and translatable relative to the top bracket;
a polyurethane material overmolding the top and bottom brackets; and
a lateral relief hole extending through the polyurethane material and being oriented parallel to the top bracket, the lateral relief hole being adapted to deform during compression of the polyurethane material as a result of relative movement of the top bracket toward the bottom bracket such that shearing of the polyurethane material is prevented.

15. The transmission mount of claim 14 wherein:
the vertical plate portion has a plate edge disposed in spaced relation to the horizontal web;
the horizontal web has an inner surface;
the lateral relief hole is disposed between the plate end and the inner surface.

16. The transmission mount of claim 15 wherein the lateral relief hole is aligned with the plate edge.

17. The transmission mount of claim 14 wherein the locking pin is generally centered within the opening to allow equidistant translation of the top bracket relative to the bottom bracket along a direction parallel to a plane defined by the opening.

18. The transmission mount of claim 14 further comprising:
a plurality of bonding holes extending through the vertical plate portion and through each one of the vertical webs;
the bonding holes being filled with the polyurethane material for bonding the polyurethane material to the top and bottom bracket.

19. The transmission mount of claim 2, wherein the resilient member encapsulates the locking pin.

20. The transmission mount of claim 2, wherein the opening is sized and configured to allow the locking pin to pivot and translate within the opening.

* * * * *